(12) United States Patent
Kawaguchi

(10) Patent No.: US 7,209,272 B2
(45) Date of Patent: Apr. 24, 2007

(54) OBJECT DETECTING APPARATUS HAVING OPERATION MONITORING FUNCTION

(75) Inventor: Tetsumasa Kawaguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/054,416

(22) Filed: Feb. 9, 2005

(65) Prior Publication Data

US 2005/0200931 A1    Sep. 15, 2005

(30) Foreign Application Priority Data

Feb. 16, 2004    (JP)    ............................. 2004-038385

(51) Int. Cl.
*G02B 26/08*    (2006.01)
(52) U.S. Cl. ...................................... 359/212
(58) Field of Classification Search ................ 359/198, 359/201–226, 843–844; 356/1.01, 141.1, 356/169, 3.01–5.15; 235/454, 462.01, 462.32, 235/473; 362/551, 554, 560
See application file for complete search history.

(56) References Cited

U.S. PATENT DOCUMENTS 5,266,788 A * 11/1993 Yamazaki et al. ..... 235/462.39
5,455,669 A    10/1995 Wetteborn
6,469,777 B2 * 10/2002 Shirai ......................... 356/5.1
6,504,600 B2 * 1/2003 Kawaguchi et al. ....... 356/4.01

FOREIGN PATENT DOCUMENTS

| JP | 5-256947    | 10/1993 |
|----|-------------|---------|
| JP | 8-029535    | 2/1996  |
| JP | 10-090412   | 4/1998  |
| JP | 2002-031685 | 1/2002  |
| JP | 2002-286844 | 10/2002 |

* cited by examiner

*Primary Examiner*—Euncha P. Cherry
(74) *Attorney, Agent, or Firm*—Harness, Dickey & Pierce, PLC

(57) ABSTRACT

An object detecting apparatus for a vehicle has a light radiation unit, a reflection mirror, a polygon mirror, a light reception unit, all disposed in a case. The apparatus further has a position adjusting device for adjusting the reflection mirror to a first position to reflect the light toward the scanning mirror or to a second position not to reflect the light toward the scanning mirror, and a light conducting member for conducting the light passing through the reflection mirror to the reception unit. The light conducting member has one end positioned opposite the radiation unit with respect to the reflection mirror.

10 Claims, 2 Drawing Sheets

OBJECT DETECTING APPARATUS HAVING OPERATION MONITORING FUNCTION

CROSS REFERENCE TO RELATED APPLICATION

This application is based on and incorporates herein by reference Japanese Patent Application No. 2004-38385 filed on Feb. 16, 2004.

FIELD OF THE INVENTION

The present invention relates to an object detecting apparatus mounted on a vehicle, for instance, for detecting an object such as a preceding vehicle or a distance to such an object by using a light wave.

BACKGROUND OF THE INVENTION

A conventional object detecting apparatus mounted on a vehicle uses a laser light, for instance, to detect an object such as a preceding vehicle or a distance to such an object. This detecting apparatus intermittently drives a laser diode to radiate the laser light towards the forward area of the vehicle, and detects the light reflected from the forward obstacle by a photo sensor. The detecting apparatus measures the distance to the forward obstacle based on a time difference between a light radiation time and a light receiving time.

Specifically, as disclosed in JP 2002-031685A, the detecting apparatus comprises a light radiation unit for radiating a laser light, a polygon mirror and a light reception unit for receiving a reflected light. The polygon mirror is shaped in a frustum of a hexagonal pyramid and rotatable as a scanning mirror. According to this construction, the polygon mirror reflects the laser light radiated from the light radiation unit and directs it to the forward area of the vehicle.

As the polygon mirror is rotated and the laser light from the light radiation unit is directed to each side surface of the polygon mirror, so that the angle of reflection of the laser light at the polygon mirror is adjusted to scan a predetermined range of the forward area of the vehicle by the laser light. The reception unit includes a Fresnel lens and a light receiving element to receive the laser light reflected from the forward object and measure the distance to the object.

This detecting apparatus requires a light radiation and light reception monitoring function to check whether the laser light is radiated without fail and the laser light reflected by the forward object is received without fail.

For this function, the detecting apparatus is provided with a transparent panel inside a case to form a self-monitoring light path. Specifically, the laser radiation unit is driven to radiate the laser light when each side surface of the polygon mirror is directed to a specified direction different from the direction for scanning the predetermined range. This laser light is reflected by the transparent panel and the reflected light is received by the reception unit. Abnormality of the detecting apparatus is determined, if the reception unit does not produce an electric signal in spite of the laser light radiation by the radiation unit.

In the above arrangement, the reception unit is disposed side by side in the lateral or horizontal direction. Namely, the reception unit is disposed on a plane perpendicular to the axis of rotation of the polygon mirror to face the polygon mirror, that is, disposed in the direction to which the laser light reflected by the polygon mirror is angle-adjusted. Thus, the laser light reflected by the polygon mirror and led to the transparent panel is reflected by the transparent panel and led to the reception unit. However, this arrangement is not possible in the case that the reception unit is disposed side by side in the vertical direction and not in the horizontal direction.

SUMMARY OF THE INVENTION

It is therefore an object of the present invention to provide an object detecting apparatus, which is capable of having a light radiation and reception monitoring function even in the case that a light reception unit and a polygon mirror is disposed sidewise in a direction other than the horizontal direction.

According to the present invention, an object detecting apparatus has a light radiation unit, a reflection mirror, a scanning mirror, a light reception unit, all disposed in a case. The apparatus further has a position adjusting device for adjusting the reflection mirror to a first position to reflect the light toward the scanning mirror or to a second position not to reflect the light toward the scanning mirror, and a light conducting member for conducting the light passing through the reflection mirror to the reception unit.

Preferably, the light conducting member has one end positioned opposite the radiation unit with respect to the reflection mirror. The light reception unit is disposed at a position displaced from the scanning mirror in a direction in which the axis of rotation of the scanning mirror extends.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
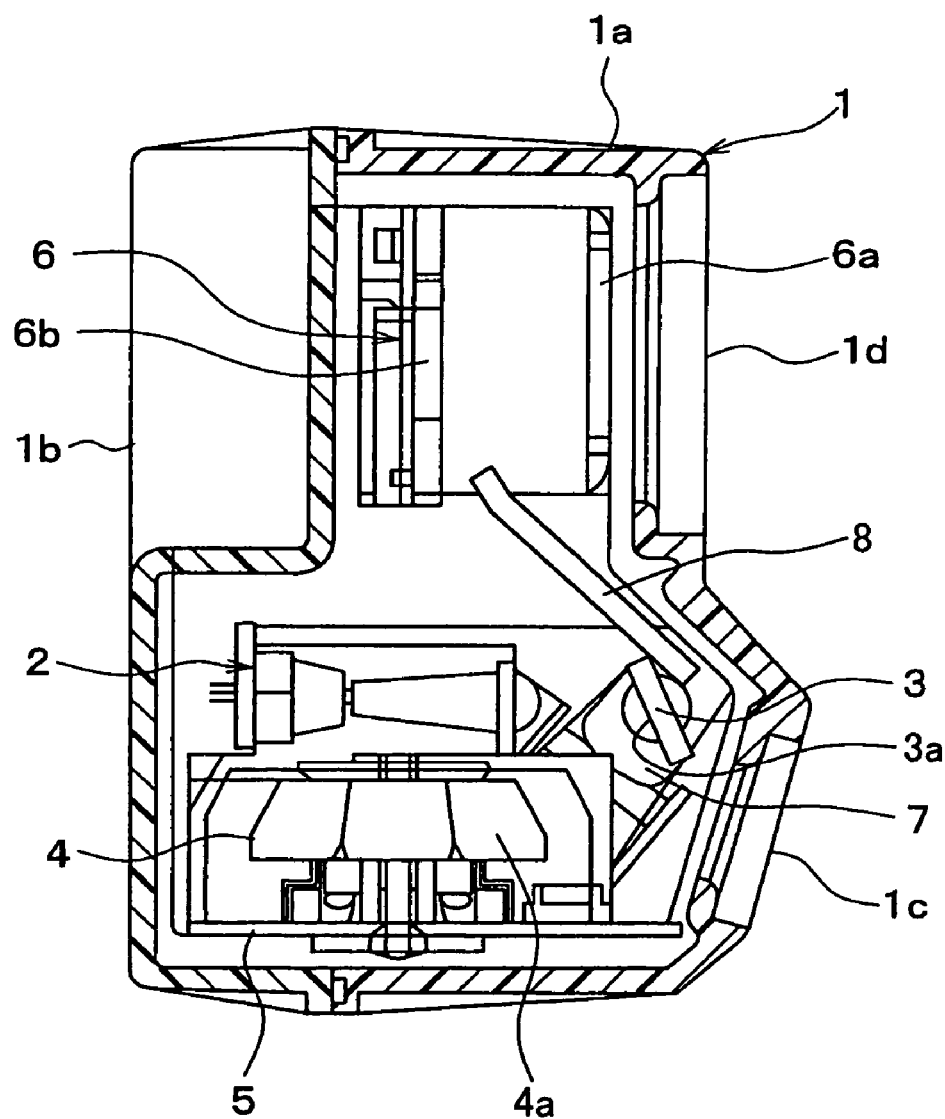
FIG. 1 is a sectional side view of an object detecting apparatus according to an embodiment of the present invention.

Referring first to FIG. 1, an object detecting apparatus includes a case 1 shaped in a cuboid and various component parts accommodated in the case 1. The apparatus is mounted on a vehicle to be used as a laser radar. The apparatus is positioned to radiate a laser light in the forward direction of the vehicle (rightward direction in FIG. 1) to detect a distance to a forward object such as a preceding vehicle (not shown) during an auto-cruise control condition.

The case 1 includes a first case 1a and a second case 1b. The first case 1a is box-shaped and open at its one side (left side in FIG. 1). The first case 1a accommodates therein various component parts. The first case 1a has a resin wall part made of PPS resin and forms a housing. The first case 1a has a light radiating window 1c and a light receiving window 1d arranged at the lower and the upper sections on the front-side resin part. The windows 1c and 1d include light-transmitting panel of glass or acrylic resin.

The second case 1b is made of resin and attached to close the opening of the first case 1a. In the case 1, an electrical connector (not shown) is provided such that it partly extends from the case 1. The connector connects the electrical parts (not shown) provided inside and outside the case 1.

The case 1 accommodates a light radiation unit 2, a reflection mirror 3, a polygon mirror 4 and an electric circuit board 5 in the lower part. The circuit board 5 includes an electronic control circuit, which are connected to the light radiation unit 2, a light reception unit 6 and the like to measure the distance to the forward object. The light reception unit 6 is positioned inside the case 1 in the upper part to face the light receiving window 1d and includes a Fresnel lens 6a and a light receiving element 6b.

The light radiation unit 2 may include a laser diode to radiate the laser light in the pulse form. The light radiation unit 2 is driven by the control circuit provided on the circuit board 5 and radiates the laser light towards the reflection mirror 3.

The reflection mirror 3 reflects the laser light radiated from the radiation unit 3 and directs it to the polygon mirror 4. The reflection mirror 3 is supported swingably (rotatably) to the inner case 1c by a position adjusting device 7 fixed to the inside wall of the case 1. For instance, the position adjusting device 7 and hence the reflection mirror 3 may be driven by a motor (not shown) and controlled by the electric circuit of the circuit board 5 to adjust the direction of reflection towards the side surface 4a of the polygon mirror 4. The reflection mirror 3 is swung (rotated) to the extent that its reflection surface 3a becomes parallel with the laser light radiated from the radiation unit 2.

The reflection mirror 3 is so positioned that at least a part of the laser light passes by the reflection mirror 3 and reaches the rear side (right side in FIG. 1) of the reflection mirror 3, when the reflection mirror 3 is swung to be substantially parallel with the laser light, i.e., in a substantially horizontal orientation (relative to the arrangement of FIG. 1). It is preferred (though not necessary) that the reflection mirror 3 is positioned to have its swing (rotation) axis offset from the path of the laser light from the radiation unit 2 so that a larger amount of the laser light from the radiation unit 2 passes by the reflection mirror 3 when the reflection mirror 3 is held horizontally.

The polygon mirror 4 is shaped in a frustum hexagonal prism and supported by the case 1. The mirror 4 is rotatable about an axis of the hexagonal prism. This mirror 4 is also driven by a motor (not shown) controlled by the control circuit of the circuit board 5. The polygon mirror 4 has around its periphery mirror surfaces 4a, each of which operates as a scanning reflection mirror.

Specifically, the polygon mirror 4 reflects the laser light radiated from the radiation unit 2 and reflected by the reflection mirror 3, and directs the laser light toward the vehicle forward area through the radiating window 1c. As the polygon mirror 4 is rotated, the angle of the side surface 4a of the polygon mirror 4 changes. As a result, the angle of projection of the laser light from the window 1c is changed to scan a predetermined forward area of the vehicle.

The Fresnel lens 6a is positioned in front of the light receiving element 6b. The Fresnel lens 6a collects the laser light reflected from the forward object and received through the window 1d. The light receiving element 6b receives the collected light and produces an output voltage or output current varying with the intensity of the received light. The output voltage or current is applied to the control circuit of the circuit board 5.

The reception unit 6 is placed above the polygon mirror 4, that is, displaced in the direction in which the rotation axis of the polygon mirror 5 extends. Thus, the laser light reflected by the polygon mirror 4 is not directed to the light reception unit 6.

A light conducting member 8 is provided in the case 1 such that its one end is directed to the rear side of the reflection mirror 3 and its other end is directed to the light receiving element 6b. This conducting member 8 is fixed to a wall between the light projecting window 1c and the light receiving window 1d.

The light conducting member 8 may be made of an acrylic resin or an optical fiber so that light incident from the one end repeatedly reflects by the peripheral surface of the member 8 and travels toward the other end. Thus, the light conducting member 8 leads the laser light entering after passing by the reflection mirror 3 to the light receiving element 6b.

The object detecting apparatus constructed as above operates in the following manner, assuming that it is mounted in a vehicle and an auto-cruise control system switch is turned on. The following operation is mostly controlled by the control circuit of the circuit board 5.

Figure 2:
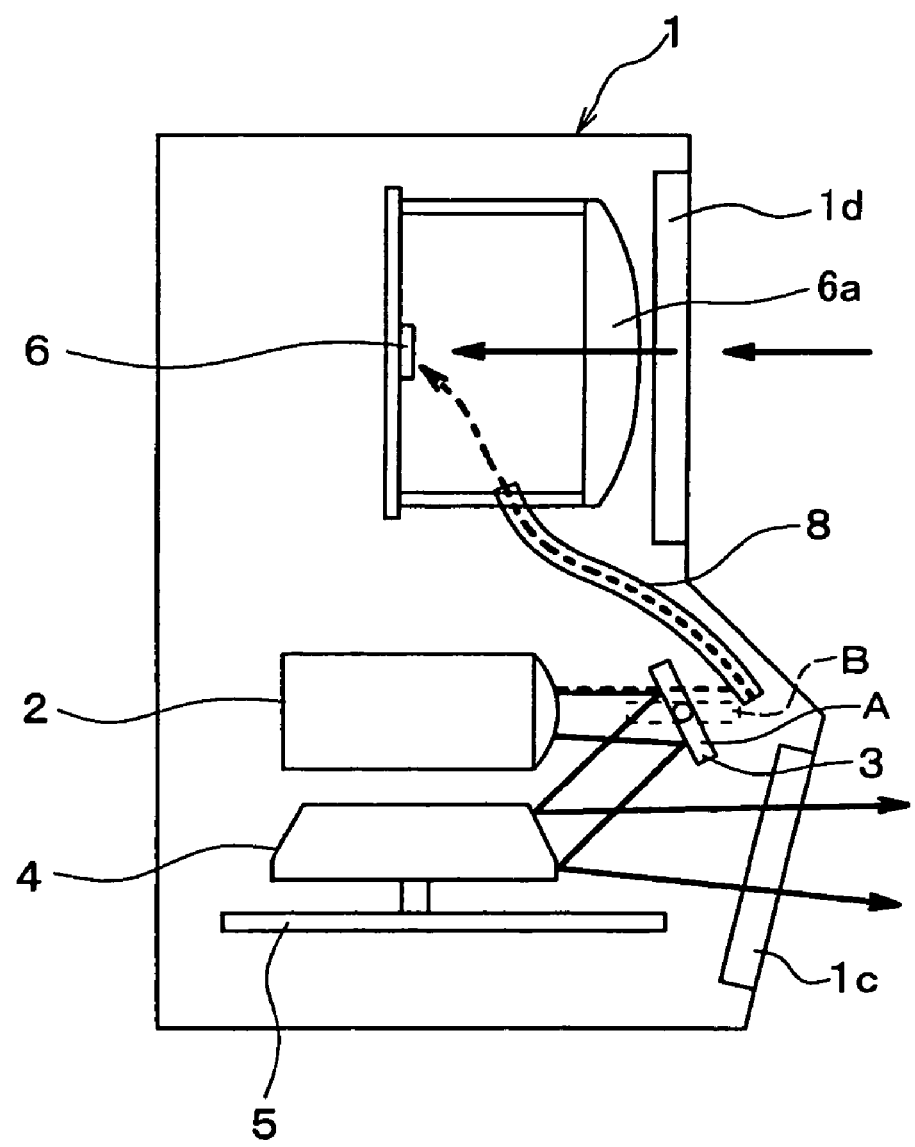
FIG. 2 is a schematic side view of the apparatus shown in FIG. 1.

The reflection mirror 3 is first driven to a predetermined first angular position (object detecting position) A as shown with a solid line in FIG. 2 by the motor at the time of distance detection, so that the reflection mirror 3 reflects a laser light toward the polygon mirror 4. The light radiation unit 2 radiates the laser light at predetermined intervals. The laser light is reflected by the reflection mirror 3 and the polygon mirror 4 to be directed toward the forward area of the vehicle through the radiating window 1c as shown with solid lines in FIG. 2. When the laser light is reflected by an object such as a preceding vehicle, the reflected light enters the light reception unit 6 through the light receiving window 1d as shown in FIG. 2.

In the light reception unit 6, the reflected light is collected by the Fresnel lens 6a and received by the light receiving element 6b. The light receiving element 6a generates an output signal in response to the reception of the collected light. Based on this output signal, the control circuit calculates a distance L to the forward object by using the laser light travel speed V and the time difference T between the laser light radiation by the radiation unit 2 and the reception of the laser light by the light reception unit 6: $L = V \times T/2$.

The calculated distance is output through the connector to various devices such as an engine control ECU and a brake control ECU provided outside the case 1. As a result, the ECUs may control an engine and/or brakes to maintain the distance to the object at a predetermined distance during the cruise control operation.

At the time of light radiation and reception monitoring operation, the reflection mirror 3 is driven by the motor to a predetermined second position (monitoring position) B as shown with a dotted line in FIG. 2. In this position B, the reflection mirror 3 is held substantially in parallel with the travel path of the laser light from the radiation unit 2.

A part of the laser light from the radiation unit 2 thus passes by the reflection mirror 3 and reaches the lower end of the light conducting member 8. This light travels in light conducting member 8 to the upper end of the light conducting member 8 and reaches the reception unit 6. This light travel path is shown with a dotted line in FIG. 2.

The light reception unit 6 produces an output signal corresponding to the laser light received from the light conducting member 8 to the control circuit, which responsively compares this output signal with a predetermined threshold to thereby determine whether the light radiation and reception is made normally or not. The comparison result of the control circuit is applied to outside devices such as a meter ECU through the connector. The meter ECU may drive a warning light provided in an instrument panel in a vehicle, when the comparison result indicates an abnormality of light radiation and reception.

As described above, the laser light from the radiation unit 2 is led to the light reception unit 6 through the light conducting member 8 at the time of monitoring without being directed to a vehicle forward area. Thus, it is made possible to monitor the light radiation and reception operation of the object detecting apparatus even in the case the light reception unit 6 is displaced from the polygon mirror 4 in the vertical direction.

The above embodiment may be modified such that the apparatus (case 1) may be placed horizontally, as long as the light reception unit 6 is displaced from the polygon mirror 4 in the direction of axis of rotation of the polygon mirror 4. The positional relation among the light radiation unit 2, the reflection mirror 3, the polygon mirror 3 and the reception unit 6 may further be changed, as long as the direction of the laser light from the radiation unit 2 is switched over by adjusting the angular position of the reflection mirror 3.

The present invention should not be limited to the disclosed embodiment and modifications, but may be implemented in many other ways without departing from the spirit of the invention.

What is claimed is:

1. An object detecting apparatus for detecting a object, the apparatus comprising:
    a case having a light radiating window and a light receiving window;
    a light radiating unit disposed in the case for radiating light;
    a scanning mirror disposed in the case for reflecting the light radiated from the radiating unit toward an outside of the case through the radiated window thereby to scan a predetermined out side area of the case;
    a light reflection mirror disposed in the case for reflecting light radiated from the radiation unit toward the scanning mirror;
    a light reception unit disposed in the case for receiving the light reflected by an object in the predetermined out side area and entering through the light receiving window;
    a position adjusting device disposed in the case for adjusting the reflection mirror to a first position to reflect the light toward the scanning mirror to a second position not to reflect the light toward the scanning mirror, and
    a light conducting member disposed in the case for conducting the light passing through the reflection mirror to the reception unit, when the reflection mirror is adjusted to the second position.

2. The object detecting apparatus as in claim 1, wherein the reflection mirror is parallel with a direction of radiation of the light by the radiation unit at the second position.

3. The object detecting apparatus as in claim 1, wherein the light conducting member has one end positioned opposite the radiation unit with respect to the reflection mirror.

4. The object detecting apparatus as in claim 1, wherein the reception unit is disposed at a position displaced from the scanning mirror in a direction of axis rotation of the scanning mirror.

5. The object detecting apparatus as in claim 1, wherein the case is mounted in a vehicle for detecting the object.

6. The object detecting apparatus as in claim 1, wherein the light conducting member is made from a glass fiber.

7. The object detecting apparatus as in claim 1, wherein the light conducting member of the apparatus is made from an optical fiber.

8. The object detecting apparatus as in claim 1, wherein the light reflection mirror partially passes the light radiated from the light radiation unit to the light conducting member when the position adjusting device adjusts the light reflection mirror to the second position.

9. The object detecting apparatus as in claim 4, wherein the reception unit and the scanning mirror are disposed in a vertical direction in the vehicle.

10. The object detecting apparatus as in claim 1, wherein the disposed to be in a second position, the light reflection mirror is disposed so as to pass light therethrough.

* * * * *